United States Patent Office 3,066,057
Patented Nov. 27, 1962

3,066,057
ROCKET PROPELLANTS
Charles C. Bice, Bartlesville, Okla., assignor to Phillips Petroleum Company, a corporation of Delaware
No Drawing. Filed Jan. 12, 1959, Ser. No. 786,342
14 Claims. (Cl. 149—19)

This invention relates to a method of preparing high energy castable propellant formulations and to the propellant prepared by following this method. The novelty resides in the use of a particular binder which is cured with a new curing system.

A considerable amount of work has been done using copolymers of conjugated dienes with copolymerizable heterocyclic nitrogen bases as the binder for a solid oxidant. Copolymers of 1,3-butadiene and 2-methyl-5-vinylpyridine are examples of such binders. Such compositions are the subject of an application of W. B. Reynolds et al., Serial No. 284,447, filed April 25, 1952.

The present invention is directed to an improvement using the liquid polymers disclosed in the application of Reynolds et al. Some difficulty has been attained using these liquid polymers in that suitable cures have been difficult to obtain. While propellants with an elongation of as low as 5 percent can be used, a greater elongation is preferred. With a sulfur cure system, using 74% by weight of ammonium nitrate, a liquid copolymer of 1,3-butadiene and 2-methyl-5-vinylpyridine was cured to give a propellant having an elongation of 6 percent. It would be preferred to have an elongation of at least 10 percent and further work has been done in an attempt to obtain improved curing systems.

The following are objects of my invention.

An object of my invention is to provide new rocket propellant compositions. A further object of my invention is to provide an improved curing system for castable propellants prepared using a solid oxidizer and a liquid binder. A further object of my invention is to provide an improved method for the production of rocket propellants.

Broadly, the invention resides in a rocket propellant consisting essentially of a solid oxidizing salt and a flexible binder, said binder being a cured mixture of (1) a liquid polymer of a conjugated diene of 4 to 6 carbon atoms and a compound selected from the group consisting of pyridine and quinoline containing a

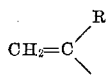

substituent where R is selected from the group consisting of hydrogen and methyl, (2) a haloalcohol where the halogen is selected from the group consisting of chlorine, bromine, and iodine, and (3) a polyisocyanate and in the method of preparing these propellants.

As will be seen from the examples, I use the term haloalcohols broadly and include compounds such as halo hydroxy ethers and esters such as those obtained by reacting glycols and halo-substituted acids.

Such propellants show elongations as high as 10 to 17 percent and the cure system has no adverse effect on the tensile strength, the tensile strength of the propellants of this invention being, generally, in the range of 100 to 250 pounds per square inch.

The propellants produced with this cure system are quite valuable because of these good physical properties.

Another valuable feature is that the propellant does not freeze at temperatures as low as —75° F. The low temperature properties make the propellant very suitable for arctic and high altitude use. Excellent case bonding has been obtained.

The curing system comprises a haloalcohol and a polyisocyanate. The suitable haloalcohols are the chloro-, bromo-, and iodoalcohols. The scope of the compounds used in the curing system will also be more fully set forth hereinafter.

In carrying out the process of my invention the liquid copolymer, the haloalcohol, and the polyisocyanate are thoroughly mixed together in a mixer until a homogeneous mixture is obtained. Thereafter the solid oxidant is added and the mixing continued until it is thoroughly mixed with the binder. The resulting composition, still flowable, is cast to any desired shape and then cured by heating. Satisfactory cures can be obtained at temperatures of 130 to 190° F. for a period of 24 to 72 hours. Heating at 160° F. for 48 hours is preferred. The order of addition of the ingredients can be varied but that set forth above is preferred.

While I do not wish to be bound by any theory of the mechanism of the cure, I believe that the haloalcohol quaternizes the pyridine nitrogen in the polymer and then the polyisocyanate crosslinks polymer chains through reaction with the hydroxyl groups. In the copolymer, the amount of nitrogen containing monomer should lie in the range of 5 to 50 percent of the polymer. In general, the higher the molecular weight of the copolymer, the lower the amount of nitrogen containing monomer can be. As liquid polymers, I include those having a viscosity of at least 40 poises at 77° F. To obtain satisfactory castings, a viscosity of approximately 1,000 poises is the upper limit. The mechanism of quaternization is explained in the Reynolds et al. application previously referred to.

The following examples illustrate my invention which is not, however, to be considered to be limited to the specific details set forth.

Example I

For this data, a copolymer of 1,3-butadiene and 2-methyl-5-vinyl-pyridine was prepared using the following recipe, the polymerization being effected at 41° F. to a conversion of about 70 percent. The copolymer had a viscosity of approximately 700 poises.

| | Parts by weight |
|---|---|
| 1,3-butadiene | 75 |
| 2-methyl-5-vinylpyridine | 25 |
| Water | 200 |
| Potassium fatty acid soap | 5.00 |
| KOH | 0.05 |
| KCl | 0.20 |
| Daxad 11 [1] | 0.20 |
| $Na_2SO_2CH_2OH \cdot 2H_2O$ | 0.10 |
| Sequestrene AA [2] | 0.04 |
| $FeSO_4 \cdot 7H_2O$ | 0.10 |
| Tert-dodecyl mercaptan | 15.00 |
| Shortstop: di-t-butylhydroquinone | 0.20 |

[1] Sodium salt of condensed alkyl aryl sulfonic acid.
[2] Ethylenediamine tetraacetic acid.

This liquid copolymer was then compounded with various cure systems, the details of which are shown in the following table, amounts being given in parts by weight.

|                                       | 1   | 2    | 3    | 4    | 5    |
|---------------------------------------|-----|------|------|------|------|
| Liquid copolymer                      | 100 | 100  | 100  | 100  | 100  |
| ZP-211 [1]                            | 0   | 55   | 75   | 75   | 35   |
| 3-Hydroxybutyl chloroacetate          | 11.8| 0    | 0    | 0    | 0    |
| 12-Hydroxy-9-octadecenyl chloroacetate| 0   | 12   | 12   | 12   | 12   |
| 3-Hydroxy-2,2-dimethylpropyl chloroacetate | 0 | 12 | 15 | 15 | 8 |
| Nacconate 310 [2]                     | 9.5 | 13.64| 16.2 | 16.2 | 10.76|
| Circo light oil [3]                   | 40  | 0    | 0    | 0    | 0    |

[1] Di-(1, 4, 7-trioxaundecyl) methane.
[2] 3,3'-dimethyldiphenylmethane 4,4'-diisocyanate.
[3] Odorless, light gold-colored oil; Sp.G., 0.92; Saybolt Furol viscosity at 100° F., about 155 seconds.

Using varying amounts of the complete binder compositions shown above, propellants were formulated using the following compositions, all parts being on a weight basis and being based upon 100 parts of the complete propellant.

|                                  | 1  | 2  | 3  | 4  | 5  |
|----------------------------------|----|----|----|----|----|
| Binder                           | 19 | 16 | 14 | 16 | 19 |
| Ammonium perchlorate             | 80 | 83 | 85 | 80 | 80 |
| Magnesium-aluminum alloy (powder)| 0  | 0  | 0  | 3  | 0  |
| Kel F Polymer Oil #3 [1]         | 1  | 1  | 1  | 1  | 1  |

[1] Polychlorotrifluoroethylene, viscosity 3 centistokes at 210° F.

Each of the propellants was mixed for 45 minutes to insure complete mixing, cast into a grain, and each grain cured at 160° F. for 48 hours.

After curing, the propellant properties were determined, these properties being set forth in the following table:

|                              | 1    | 2     | 3     | 5      |
|------------------------------|------|-------|-------|--------|
| Ultimate stress, p.s.i.:     |      |       |       |        |
| −70° F                       |      |       |       | 508    |
| 75° F                        | 35   | 127   | 192   | 121    |
| 170° F                       |      |       |       | 73     |
| Ultimate elongation, percent:|      |       |       |        |
| −70° F                       |      |       |       | 10.6   |
| 75° F                        | 11.3 | 8.4   | 6.8   | 16.9   |
| 170° F                       |      |       |       | 15.9   |
| Young's Modulus, p.s.i.:     |      |       |       |        |
| −70° F                       |      |       |       | 12,120 |
| 75° F                        | 326  | 1,622 | 3,130 | 752    |
| 170° F                       |      |       |       | 533    |

The burning properties of the Run 5 propellant were as follows:

Burning rate (in./sec. at 1000 p.s.i.) _____ 0.315
Burning rate exponent _____ 0.16
Specific impulse (lbs. sec./lbs.) at 1000 p.s.i. ___ 226.8

Example II

In some work, it has been found desirable to fractionate the liquid polymer prior to use. This example illustrates this procedure. The copolymer of Example I was dissolved in toluene. Thereafter, the polymer was precipitated fractionally by adding methanol and the first fraction used in the preparation of a propellant. This first fraction was 48 percent by weight of the original polymer and contained the material of highest molecular weight. This first fraction had a bound 2-methyl-5-vinylpyridine content of 17.3 weight percent compared to 20.6 weight percent for the original polymer. The inherent viscosity of the original polymer was 25 percent. Using the first fraction binder compositions were prepared according to the following recipe:

Parts by weight
Polymer _____ 100
ZP-211 _____ 35
12-hydroxy-9-octadecenyl chloroacetate _____ 12
3-hydroxy-2,2-dimethylpropyl chloroacetate _____ 8
Nacconate 310 _____ 10.76

Using the same mixing procedure and curing procedure of Example I, grains were prepared using 19 parts by weight of the binder, 1 part of Kel F Polymer Oil #3, and 80 parts of ammonium perchlorate and physical properties determined. These physical properties are shown in the following table:

| Test Temperature | Ultimate Stress, p.s.i. | Ultimate Elongation, percent | Young's Modulus, p.s.i. |
|------------------|-------------------------|------------------------------|-------------------------|
| 75° F            | 121                     | 17                           | 752                     |
| 170° F           | 73                      | 16                           | 533                     |

As those skilled in the art will understand, the conjugated dienes which can be employed are, in addition to butadiene, those which contain up to 6 carbon atoms per molecule and include isoprene-(2-methyl-1,3-butadiene), piperylene, 2-methyl-1,3-pentadiene, 2,3-dimethyl-1,3-butadiene, and others. Mixtures of conjugated dienes can be used.

The polymerizable heterocyclic nitrogen bases which are applicable in our invention are those of the pyridine and quinoline series which are copolymerizable with a conjugated diene and contain one and only one

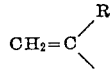

substituent wherein R is either hydrogen or a methyl group. That is, the substituent is either a vinyl or an alpha-methylvinyl (isopropenyl) group. Of these compounds, the pyridine derivatives are of the greatest interest commercially at present. Various substituted derivatives are also applicable but the total number of carbon atoms in the nuclear substituted groups, such as alkyl groups, in addition to the vinyl or alpha-methylvinyl group, should not be greater than 12 because the polymerization rate decreases somewhat with increasing size of the alkyl group. Compounds where the alkyl substituents are methyl and/or ethyl are available commercially.

These heterocyclic nitrogen bases have the formula:

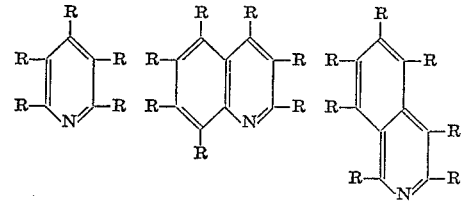

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups in addition to the vinyl or alpha-methylvinyl group, being not greater than 12. Examples of such compounds are 2-vinylpyridine; 2-vinyl-5-ethylpyridine; 2-methyl-5-vinylpyridine; 4-vinylpyridine; 2,3,4-trimethyl-5 - vinylpyridine; 3,4,5,6 - tetramethyl - 2 - vinylpyridine; 3-ethyl-5-vinylpyridine; 2,6-diethyl-4-vinylpyridine; 2-isopropyl - 4 - nonyl - 5 - vinylpyridine; 2 - methyl - 5 - un - decyl - 3 - vinylpyridine; 2,3 - dimethyl - 5,6 - dipentyl - 3 - vinylpyridine; 2 - decyl - 5 - (alpha - methylvinyl)pyridine; 2 - vinyl - 3 - methyl - 5 - ethylpyridine; 2 - methoxy-4 - chloro - 6 - vinylpyridine; 3 - vinyl - 5 - ethoxypyridine; 2 - vinyl - 4,5 - dichloropyridine; 2 - (alpha - methylvinyl) - 4 - hydroxyl - 6 - cyanopyridine; 2 - vinyl - 4 - phenoxy - 5 - methylpyridine; 2 - cyano - 5 - (alpha - methylvinyl)pyridine; 3 - vinyl - 5 - phenylpyridine; 2 - (para - methylphenyl) - 3 - vinyl - 4 - methylpyridine; 3 - vinyl - 5 - (hydroxyphenyl) - pyridine; 2 - vinylquinoline;

2-vinyl-4-ethylquinoline; 3-vinyl-6,7-di-n-propylquinoline; 2-methyl-4-nonyl-6-vinylquinoline; 4-(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethyl-quinoline; 3-vinyl-5,6-dichloroisoquinoline; 2-vinyl-6-ethoxy-7-methylquinoline; 3-vinyl-6-hydroxymethylisoquinoline; and the like. Mixtures can be used.

The copolymers are prepared by polymerizing a major amount of the diene with a minor amount of the heterocyclic nitrogen base by any suitable method. The haloalcohols used can be chloroalcohols, previously mentioned, and bromoalcohols and iodoalcohols. From the examples, it will be seen that mixtures of haloalcohols can be used. While all alcohols are believed suitable, those having the halogen and the hydroxyl groups in the terminal positions are preferred. These alcohols range from the most simple ones, such as 2-chloroethyl alcohol and 3-chloropropyl alcohol to more complex alcohols including other linkages such as ester linkages and ether linkages. Alcohols having a range of 2 to 18 carbon atoms are suitable. Preferred are alcohols liquid at the temperature of mixing but those solid and soluble in the liquid polymer are also suitable. The following alcohols are representative of those which can be used: 4-hydroxybutyl α-chloroacetate, 4-hydroxybutyl α-bromoacetate, 4-hydroxybutyl α-iodoacetate, 4-hydroxybutyl α-chloropropionate, 4-hydroxybutyl α-bromopropionate, 4-hydroxybutyl α-iodopropionate, 2-hydroxyethyl α-chloroacetate, 2-hydroxyethyl α-bromoacetate, 2-hydroxyethyl α-iodoacetate, 2-hydroxyethyl α-chloropropionate, 2-hydroxyethyl α-bromopropionate, 2-hydroxyethyl α-iodopropionate, 2-hydroxyethoxyethyl α-chloroacetate, 2-hydroxyethoxyethyl α-bromoacetate, 2-hydroxyethoxyethyl α-iodoacetate, 2-hydroxyethoxyethyl α-chloropropionate, 2-hydroxyethoxyethyl α-bromopropionate, 2-hydroxyethoxyethyl α-iodopropionate, 2-hydroxypropyl α-chloroacetate, 2-hydroxypropyl α-bromoacetate, 2-hydroxypropyl α-iodoacetate, 2-hydroxypropyl α-chloropropionate, 2-hydroxypropyl α-bromopropionate, 2-hydroxypropyl α-iodopropionate, 2-(2-hydroxypropoxy)-propyl α-chloroacetate, 2-(2-hydroxypropoxy)-propyl α-bromoacetate, 2-(2-hydroxypropoxy)-propyl α-iodoacetate, 2-(2-hydroxypropoxy)-propyl α-chloropropionate, 2-(2-hydroxypropoxy)-propyl α-iodopropionate, 2-(2-hydroxypropoxy)-propyl α-bromopropionate, 6-hydroxyhexyl α-chloroacetate, 6-hydroxyhexyl α-bromoacetate, 6-hydroxyhexyl α-iodoacetate, 6-hydroxyhexyl α-chloropropionate, 6-hydroxyhexyl α-bromopropionate, 6-hydroxyhexyl α-iodopropionate, 4-(2-hydroxy-1-methylethoxy)-benzyl chloride, 4-(2-hydroxy-2 methylethoxy)-benzyl chloride, 4-(2-hydroxyethoxy)benzyl chloride, the condensation product of 4-hydroxymethylbenzyl chloride with two or three mols of propylene oxide, 4-hydroxymethyl-α-chloroacetophenone, 4-(2-hydroxyethoxymethyl)-α-chloroacetophenone, 4-(2-hydroxy-1-methyl-ethoxymethyl)-α-chloro-acetophenone and 4-(2-hydroxy-2-methyl-ethoxymethyl)-α-chloro-acetophenone.

Likewise, a large number of polyisocyanates can be used although the diisocyanates are preferred. Operable polyisocyanates include aromatic, aliphatic, aryl-aliphatic, cyclic and polycyclic. Suitable examples of these compounds include polymethylene diisocyanates and diisothiocyanates such as ethylene diisocyanate, trimethylene diisocyanate, dodecamethylene diisocyanate, hexamethylene diisocyanate, tetramethylene diisocyanate, pentamethylene diisocyanate, and the corresponding diisothiocyanates; alkylene diisocyanates and diisothiocyanates such as propylene-1,2-diisocyanate, 2,3-dimethyl-tetramethylene diisocyanate and diisothiocyanate, butylene-1,2-diisocyanate, butylene-1,3-diisothiocyanate, and butylene-1,3-diisocyanate; alkylidene diisocyanates such as ethylidene diisocyanate ($CH_3CH(NCO)_2$); cycloalkylene diisocyanates such as 1,4-diisocyanatocyclohexane, cyclopentylene-1,3-diisocyanate; aromatic polyisocyanates such as m-phenylene diisocyanate, p-phenylene diisocyanate, 1-methyl-phenylene-2,4-diisocyanate, naphthylene-1,4-diisocyanate, o,o'-toluene diisocyanate, diphenyl-4,4'-diisocyanate, benzene-1,2,4 triisocyanate, 5-nitro-1,3-phenylene diisocyanate, xylylene-1,4-diisocyanate, xylylene-1,3-diisocyanate, 4,4'-diphenylenemethane diisocyanate, 4,4'-diphenylenepropane diisocyanate and xylylene-1,4-diisocyanate; aliphatic-aromatic diisocyanates such as phenylethylene diisocyanate

Toluene-2,4-diisocyanate and 3,3'-dimethyldiphenylmethane 4,4'-diisocyanate are preferred species.

I use 0.15 to 1, preferably 0.2 to 0.3, mol of the haloalcohol per mol of nuclear nitrogen in the liquid polymers and sufficient polyisocyanate to provide 0.15 to 1, preferably one, isocyanate radical per mol of haloalcohol.

Any of the solid oxidizers normally used in propellant compositions of this type can be used. Solid inorganic oxidizing salts have been used for many years, these including ammonium nitrate, lithium nitrate, sodium nitrate, potassium nitrate, ammonium perchlorate, sodium perchlorate, potassium perchlorate, and lithium perchlorate. Solid organic oxidizers such as nitroguanidine, ammonium picrate and sodium picrate are also suitable. Mixture of these oxidants can also be used.

As many possible embodiments can be made of this invention without departing from the scope thereof, it is to be understood that all matter herein set forth is to be interpreted as illustrative and not as unduly limiting the invention.

I claim:

1. A rocket propellant consisting essentially of a solid oxidizing salt and a flexible binder, said binder being a cured mixture of (1) a liquid polymer of a conjugated diene of 4 to 6 carbon atoms and a compound selected from the group consisting of pyridine and quinoline containing a

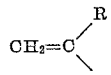

substituent where R is selected from the group consisting of hydrogen and methyl, (2) a haloalcohol containing 2 to 18 carbon atoms where the halogen is selected from the group consisting of chlorine, bromine, and iodine, in an amount to provide 0.15 to 1 mol of haloalcohol per mol of nuclear nitrogen in said liquid polymer, and (3) a polyisocyanate containing 4 to 17 carbon atoms in an amount to provide 0.15 to 1 isocyanate radical per mol of haloalcohol.

2. The propellant of claim 1 wherein said liquid polymer is a polymer of 1,3-butadiene and 2-methyl-5-vinylpyridine.

3. The propellant of claim 1 wherein said liquid polymer is a polymer of 1,3-butadiene and 2-vinylpyridine.

4. The propellant of claim 1 wherein said liquid polymer is a polymer of 1,3-butadiene and 2-vinyl-5-ethylpyridine.

5. A rocket propellant consisting essentially of ammonium perchlorate and a flexible binder, said binder being a cured mixture of (1) a liquid polymer of 1,3-butadiene and 2-methyl-5-vinylpyridine, (2) 0.15 to 1 mol of 3-hydroxybutyl chloroacetate, per mol of nuclear nitrogen in said liquid polymer, and (3) 3,3'-dimethyldiphenylmethane 4,4-diisocyanate in an amount of 0.15 to 1 isocyanate radical per mol of 3-hydroxybutyl chloroacetate.

6. A rocket propellant consisting essentially of ammonium perchlorate and a flexible binder, said binder being a cured mixture of (1) a liquid polymer of 1,3-butadiene and 2-methyl-5-vinylpyridine, (2) a mixture of 12-hydroxy-9-octadecenyl chloroacetate and 3-hydroxydimethylpropyl chloroacetate, in an amount of 0.15 to 1 mol of haloalcohol per mol of nuclear nitrogen in said liquid polymer, and (3) 3,3'-dimethyldiphenylmethane 4,4'-diisocyanate in an amount of 0.15 to 1 isocyanate radical per mol of haloalcohol in said mixture.

7. A method of preparing a rocket propellant comprising mixing (1) a solid oxidizing salt, (2) a liquid polymer of a conjugated diene of 4 to 6 carbon atoms and a compound selected from the group consisting of pyridine and quinoline containing a

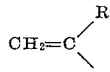

substituent where R is selected from the group consisting of hydrogen and methyl, (3) a haloalcohol containing 2 to 18 carbon atoms where the halogen is selected from the group consisting of chlorine, bromine, and iodine, in an amount of 0.15 to 1 mol of haloalcohol per mol of nuclear nitrogen in said liquid polymer, and (4) a polyisocyanate containing 4 to 17 carbon atoms in an amount of 0.15 to 1 isocyanate radical per mol of haloalcohol, forming the mixture to a desired shape, and heating the formed mixture to cure the same.

8. The method of claim 7 wherein said propellant is cured by heating at a temperature of 130° F. to 190° F. for 24 to 72 hours.

9. The method of claim 7 wherein the liquid polymer is a polymer of 1,3-butadiene and 2-methyl-5-vinylpyridine.

10. The method of claim 7 wherein the liquid polymer is a polymer of 1,3-butadiene and 2-vinylpyridine.

11. The method of claim 7 wherein the liquid polymer is a polymer of 1,3-butadiene and 2-vinyl-5-ethylpyridine.

12. A method of preparing a rocket propellant comprising mixing (1) ammonium perchlorate, (2) a liquid copolymer of 1,3-butadiene and 2-methyl-5-vinylpyridine, (3) 0.15 to 1 mol of 3-hydroxylbutyl chloroacetate, per mol of nuclear nitrogen in said liquid copolymer, and (4) 3,3'-dimethyldiphenylmethane 4,4'-diisocyanate in an amount of 0.15 to 1 isocyanate radical per mol of 3-hydroxybutyl chloroacetate, forming the mixture to a desired shape, and heating the formed mixture at a temperature of 130° F. to 190° F. for 24 to 72 hours.

13. A method of preparing a rocket propellant comprising mixing (1) ammonium perchlorate, (2) a liquid copolymer of 1,3-butadiene and 2-methyl-5-vinylpyridine, (3) a mixture of 12-hydroxy-9-octadecenyl chloroacetate and 3-hydroxydimethylpropyl chloroacetate, in an amount of 0.15 to 1 mol of haloalcohol per mol of nuclear nitrogen in said liquid copolymer, and (4) 3,3'-dimethyldiphenylmethane 4,4'-diisocyanate, in an amount of 0.15 to 1 isocyanate radical per mol of haloalcohol in said mixture, forming the mixture to a desired shape, and heating the formed mixture at a temperature of 130° F. to 190° F. for 24 to 72 hours.

14. A rocket propellant consisting essentially of a flexible binder of the following composition:

| | Parts by weight |
|---|---|
| Liquid copolymer of 1,3-butadiene and 2-methyl-5-vinylpyridine | 100 |
| Di-(1,4,7-trioxaundecyl)methane | 35–7 |
| 12-Hydroxy-9-octadecenyl chloroacetate | 1 |
| 3-Hydroxy-2,2-dimethylpropyl chloroacetate | 8–12 |
| 3,3'-dimethyldiphenylmethane 4,4'-diisocyanate | 10.76–16.2 | said propellant having the following composition:

| | Parts by weight |
|---|---|
| Binder (as above) | 14–19 |
| Ammonium perchlorate | 80–85 |
| Magnesium-aluminum alloy (powder) | 0–3 |
| Polychlorotrifluorethylene | 1 | said ingredients of said propellant being selected to give a total of 100 parts.

References Cited in the file of this patent
UNITED STATES PATENTS
2,877,504    Fox _____ Mar. 17, 1959
OTHER REFERENCES
Chem. and Eng. News, Oct. 7, 1957, pp. 62–3.